Aug. 22, 1961   E. M. LITTLE ET AL   2,997,436
GAS IONIZING AND COMPRESSING DEVICE
Filed Oct. 8, 1957

One Turn Metal Sheet Cross Section

INVENTORS
Vernal Josephson,
Edward M. Little, David B. Thomson
Franklin Robert Scott
BY

United States Patent Office 2,997,436
Patented Aug. 22, 1961

2,997,436
GAS IONIZING AND COMPRESSING DEVICE
Edward M. Little and David B. Thomson, Los Alamos, N. Mex., and Vernal Josephson, Palos Verdes Estates, and Robert Scott Franklin, San Diego, Calif., assignors to the United States of America, as represented by the United States Atomic Energy Commission
Filed Oct. 8, 1957, Ser. No. 689,018
5 Claims. (Cl. 204—193.2)

Apparatus for producing and controlling exceedingly hot gaseous plasmas is becoming of ever increasing importance. Such apparatus is useful for producing closely controlled-in-time high intensity illumination for high speed photography. Other uses, depending on the selection of the gas, include the producing of X-rays and/or neutrons. In the case of X-rays, a gas such as argon is selected and for neutrons the gas is preferably a mixture of deuterium and tritium.

It is well known in the art that a high energy gaseous discharge can be induced in a gas by the imposition of a sufficiently high potential across electrodes positioned in the gas. However, the effects of a discharge terminating on electrodes causes deleterious contamination of the discharge vessel and the gas by electrode material.

It has been determined that if a very rapidly changing high intensity magnetic field is impressed through a gas zone that the potentials generated in space cause ionization and produce a plasma. It has also been determined that if the magnetic lines of force define a field of generally conical or tapered configuration the plasma will be propelled toward the large end of the field. The reason for this is that the plasma is apparently initially pinched at the small end of the tapered magnetic field and as the pinch progresses toward the large end of the field the plasma is propelled outwardly.

Additional "Joule" heating may be injected into the plasma by the further transfer of energy from rapidly changing high intensity longitudinal magnetic fields.

It is further contemplated in accordance with the present invention that two very hot plasmas will be propelled toward each other to collide in a middle zone and an additional rapidly increasing magnetic field applied to cause adiabatic compression and therefore further heating.

Figure 2:
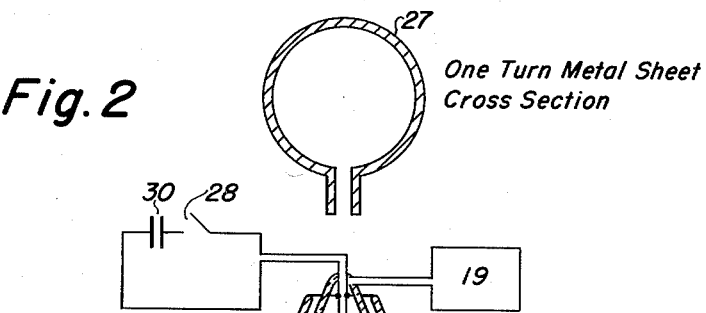
Figure 1:
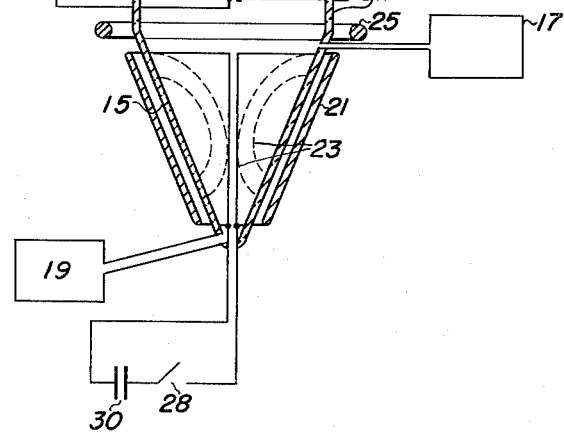

The above and other objectives and advantages of this invention will become apparent as this description proceeds with reference to the drawing in which: FIGURE 1 is a longitudinal cross section of an embodiment in accordance with this invention and FIGURE 2 is a transverse diagrammatic view of one of the elements utilized in the embodiment of FIGURE 1.

Referring to FIGURE 1 of the drawing, a shock tube generally indicated by numeral 9 is shown to comprise two tapered sections 13 and 15 joined to a middle cylindrical section 11.

The initial production of the plasma masses in the tapered sections of the shock tube is produced by single-turn flat metal conductors 21 of exceedingly low inductance and high current carrying capacity. These conductors have a conical shape similar to that of the shock tube tapered end sections and are connected through switches 28 to respective capacitors 30. The capacitors are of large size such as from 6 to about 12 microfarads and are charged to a potential of from about 12 to about 25 kilovolts. The shape of the magnetic field when coil 21 is energized is shown by dashed lines 23.

A cylindrical flat conductor of high current carrying capacity is supported about the middle cylindrical section of the shock tube and is also connected to a capacitor capable of sustaining high energy content. For example, capacitor 31 connected to the cylindrical conductor 27 through switch 32 may have a capacitance of 190 microfarads and is charged to a potential of from 10 to 25 kilovolts. The shape of magnetic field generated by coil 27 when energized is shown by dashed lines 27'.

In operation it is necessary that the shock tube be carefully purged of gases other than that to be selected and to this end purging apparatus 17 is coupled to the shock tube. It is also necessary that a selected gas be introduced into the shock tube and for this purpose gas emitter 19 is provided. The pressure of the gas is not critical and it has been found that pressures of between 1 and 1000 microns are suitable.

The mechanics of the generation of the plasma and its adiabatic compression to very high temperatures is as follows. As mentioned previously, a high rate of change in the density of a magnetic field passing through a gas results in ionization in the gas. In the present case the magnetic field is generated by a coil of generally circular cross-sectional shape and expanding configuration in its axial direction. The state of ionization of the gas establishes what is equivalent to a very low resistance single-turn secondary winding of a transformer. The induced currents in such a secondary establish a magnetic field which interacts with the magnetic field of the primary inducing winding to cause shrinkage, i.e., compression of the gaseous conductor. Up to this point two types of heating have taken place in the gas, the first being that of the usual $I^2R$ heating in the gas and the second being due to the compression of the plasma so formed. In accordance with the instant invention, the plasma is formed in a rapidly changing tapered magnetic field. Compression of the plasma due to the magnetic repulsion effect above mentioned, causes the plasma mass to become pinched first at the small end of the tapered magnetic field, with the pinch progressing toward the larger end of the field, therefore generating a shock wave which is propelled out of the diverging magnetic field.

It has been mentioned supra that the diverging magnetic fields 23 generated in the tapered sections of the shock tube cause a generation and propulsion of plasmas into the middle section of the shock tube. In order to prevent interference between the shock producing magnetic fields produced by coils 21 with the second stage compressing magnetic field 27' generated by coil 27, isolation rings 25 are provided. The copper rings 25 are continuous and surround the shock tube at the intersection of the tapered section with the cylindrical section and in the usual manner act as shields against a changing magnetic field.

A transverse cross section of coil 27 is shown in FIGURE 2 to clearly show the one-turn configuration of this coil. Coils 21 are similar except that in a longitudinal sense they taper from one end to the other.

In operation the ionizing and pre-heating shocks are produced by coils 21 when switches 28 are closed. The shocks from the tube end sections collide at the center of the middle cylindrical section and the hot plasma masses are further compressed and heated by the application of a strong $B_z$ field generated by coil 27.

In order to prevent contamination of the gas by disintegration effects of the wall material the hot plasmas are channeled within the walls of the middle section by a slowly rising magnetic field (not shown) which may be generated by coil 29.

The one-turn sheet conductors on each tapered section can be replaced by parallel coils of heavy conductors, for example, the conical sheet can be replaced by three two-turn coils spaced longitudinally and excited in parallel.

The tapered sections of shock tube 9 have produced shock waves having velocities in excess of 10 centimeters/microsecond. Further application of devices of this nature would feasibly be for rocket motors operating in a region of relatively high rarification. In such an application a gas such as hydrogen would be introduced into the small end of the tapered section, ionized and accelerated out of the large end of the tapered section. The plasmas are electrically neutral and since they therefore would not be attracted back to the body of the rocket, an effective propulsion force would be generated. Rapid electrical pulsing of the tapered section results in a succession of propulsion thrusts.

The foregoing has described a device for producing exceedingly high temperatures in gaseous plasmas. These high temperatures result in phenomena that can be utilized for various useful purposes such as illumination for photographic purposes, the generation of X-rays if argon gas is selected, and the generation of neutrons if, for example, deuterium or a mixture of deuterium and tritium is utilized. The above described embodiment is presented for the purpose of facilitating the explanation of this invention and not for purposes of limiting the scope thereof. It is understood that other ramifications are likely and possible within the spirit of this invention and, accordingly, it is desired that it be understood that the invention be considered limited only by the appended claims taken in view of the prior art.

What is claimed is:

1. A device for producing high energy plasmas comprising a shock tube having tapered end sections hermetically joined to a middle straight section, exceedingly low inductance coils situated about each tapered end section, said coils having a geometrical configuration similar to that of but slightly larger than the tapered end section, an exceedingly low inductance coil situated about the shock tube middle section, magnetic shield means supported between each of the tapered end sections and the middle straight section, a potential source connected to each of said conductors whereby energization of said end conductors causes the generation and propulsion of plasma masses into the middle straight section and the generation of a rapidly rising magnetic field by the conductor about the middle section causes adiabatic heating of shock pre-heated plasma.

2. A device for producing high energy gaseous plasmas comprising a unitary refractory vessel having conical end portions and a cylindrical middle portion, means for evacuating said vessel and for introducing a selected gas to a pressure of between 1 and 1000 microns, means for generating a substantially spontaneous diverging magnetic field in said vessel end portions, means for generating a substantially spontaneous axial magnetic field in the cylindrical portion and means for generating a slowly rising axial magnetic field in said cylindrical portion.

3. The device of claim 2 in which magnetic isolation means are interposed at each junction between the tapered end sections and the cylindrical section.

4. The device of claim 2 in which the means for generating the substantially spontaneous magnetic fields are high current capacity sheet conductors surrounding the respective portion of the device.

5. The device of claim 2 in which the selected gas is deuterium.

References Cited in the file of this patent

FOREIGN PATENTS 1,132,526     France                 Nov. 5, 1956

OTHER REFERENCES

TID-7536 (Part I) Controlled Thermonuclear Reactions, September 1957, U.S. Atomic Energy Comm. Technical Information Service, Oak Ridge, Tenn.; page 8.

J. Nuclear Energy, II, vol. 5, pp. 71–85, June 27, 1957.

Physical Review, vol. 59, June 15, 1941, pp. 997–1004.

Nucleonics, August 1957, pp. 50–55.

Physical Review, vol. 107, No. 2, July 15, 1957, pp. 345–350.

Magnetohydrodynamics, by R. K. M. Landshoff, Stanford U. Press, Stanford, Calif., 1957; pages 76–91.

Project Sherwood, by A. S. Biship, 1958, Addison Wesley Publishing Co., Reading, Mass.; pages 143–147.

UNITED STATES PATENT OFFICE
CERTIFICATE OF CORRECTION

Patent No. 2,997,436

August 22, 1961

Edward M. Little et al.

It is hereby certified that error appears in the above numbered patent requiring correction and that the said Letters Patent should read as corrected below.

In the grant, line 3, and in the heading to the printed specification, line 5, name of fourth inventor, for "Robert Scott Franklin", each occurrence, read -- Franklin Robert Scott --.

Signed and sealed this 16th day of January 1962.

(SEAL)
Attest:

ERNEST W. SWIDER
Attesting Officer

DAVID L. LADD
Commissioner of Patents